(12) United States Patent
Hiramatsu

(10) Patent No.: US 11,057,978 B2
(45) Date of Patent: Jul. 6, 2021

(54) LIGHTING CONTROL SYSTEM AND LIGHTING CONTROL METHOD

(71) Applicant: Yazaki Corporation, Tokyo (JP)

(72) Inventor: Ryo Hiramatsu, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 16/820,947

(22) Filed: Mar. 17, 2020

(65) Prior Publication Data
US 2020/0337139 A1 Oct. 22, 2020

(30) Foreign Application Priority Data
Apr. 19, 2019 (JP) .............................. JP2019-079735

(51) Int. Cl.
| | |
|---|---|
| *H05B 47/125* | (2020.01) |
| *B60Q 3/70* | (2017.01) |
| *G06K 9/00* | (2006.01) |
| *B60Q 3/80* | (2017.01) |
| *H05B 47/11* | (2020.01) |
| *H04N 5/33* | (2006.01) |

(52) U.S. Cl.
CPC .............. *H05B 47/125* (2020.01); *B60Q 3/70* (2017.02); *B60Q 3/80* (2017.02); *G06K 9/00832* (2013.01); *H05B 47/11* (2020.01); *H04N 5/33* (2013.01)

(58) Field of Classification Search
CPC ........ H05B 45/10; H05B 45/12; H05B 47/10; H05B 47/105; H05B 47/11; H05B 47/115; H05B 47/125; H05B 47/13; H05B 47/155; H05B 47/17; B60Q 3/60; B60Q 3/70; B60Q 3/80; B60Q 2300/20; B60Q 2300/22; B60Q 2300/23; G06K 9/00624; G06K 9/00832; G06K 9/00838; G06K 9/00845
See application file for complete search history.

(56) References Cited

U.S. PATENT DOCUMENTS

| | | | |
|---|---|---|---|
| 7,401,920 B1 * | 7/2008 | Kranz .................... | A61B 3/113 351/209 |
| 2002/0024713 A1 * | 2/2002 | Roberts ................ | H04B 1/3805 359/267 |

(Continued)

FOREIGN PATENT DOCUMENTS

JP 2016-107864 A 6/2016

*Primary Examiner* — Jason Crawford
(74) *Attorney, Agent, or Firm* — Sughrue Mion, PLLC

(57) ABSTRACT

An objective of the present invention is to control vehicle cabin lighting with suppressed unnecessary turning on. The objective is achieved by a lighting control system comprising a vehicle cabin lighting for illuminating from above an interior of a vehicle cabin in a vehicle with a front seat and a rear seat; an information acquisition unit for acquiring distance measurement information about the interior of the vehicle cabin from a front side reference position in the vehicle cabin, a determination unit for determining based on the distance measurement information from the information acquisition unit at least whether a front seat passenger sitting on the front seat performed a head turning action in which he turned his head toward a side of the rear seat, and a control unit for performing on/off-control of the vehicle cabin lighting at least based on a determination result from in the determination unit.

20 Claims, 4 Drawing Sheets

(56) References Cited

U.S. PATENT DOCUMENTS

| | | | |
|---|---|---|---|
| 2006/0018641 A1* | 1/2006 | Goto | B60R 25/1004 396/4 |
| 2007/0086624 A1* | 4/2007 | Breed | B60R 21/01516 382/104 |
| 2010/0014711 A1* | 1/2010 | Camhi | B60Q 3/80 382/104 |
| 2016/0001781 A1* | 1/2016 | Fung | B60K 28/02 701/36 |
| 2016/0152178 A1* | 6/2016 | Peterson | B60Q 3/80 315/77 |
| 2017/0270924 A1* | 9/2017 | Fleurence | G10L 15/22 |
| 2018/0012090 A1* | 1/2018 | Herbst | G06K 9/6212 |
| 2018/0204078 A1* | 7/2018 | Seng | B60W 50/16 |
| 2020/0001783 A1* | 1/2020 | Suzuki | H04N 13/204 |
| 2020/0012848 A1* | 1/2020 | Goto | G06T 7/246 |
| 2020/0184669 A1* | 6/2020 | Stent | G06T 7/70 |
| 2020/0198533 A1* | 6/2020 | Gedrimas | B60Q 1/30 |
| 2020/0324696 A1* | 10/2020 | Hiramatsu | B60Q 3/80 |

* cited by examiner

LIGHTING CONTROL SYSTEM AND LIGHTING CONTROL METHOD

CROSS-REFERENCE TO RELATED APPLICATION(S)

The present application claims priority to and incorporates by reference the entire contents of Japanese Patent Application No. 2019-079735 filed in Japan on Apr. 19, 2019.

BACKGROUND OF THE INVENTION

Technical Field

The present invention relates to a lighting control system and a lighting control method for controlling lighting inside a vehicle cabin in a vehicle.

Background Art

If it is dark inside a vehicle cabin when a passenger at a front seat in a vehicle checks luggage at a rear seat etc., it is general that a vehicle cabin lighting is operated by the passenger to be ON in order to guarantee brightness. On the other hand, in some cases, the passenger may feel troublesomeness if the vehicle cabin lighting should be operated to be ON frequently in case that he has to check many times.

Therefore, it is proposed to acquire an image of the interior of a vehicle cabin, determine based on the image whether a passenger performed a specific action which was registered previously, and to turn on the vehicle cabin lighting based on the determination result (e.g. see Patent Literature 1). In this manner, registering a head turning action etc. of a passenger at a seat as the specific action previously which is a trigger for turning on the vehicle cabin lighting enables the vehicle cabin lighting to be turned on automatically upon such a head turning action.

CITATION LIST

Patent Literature

Patent Literature 1: JP 2016-107864 A

SUMMARY OF THE INVENTION

However, with the above-described technology which determines the specific action of a passenger based on the acquired image, the vehicle cabin lighting may be turned on even when turning on the vehicle cabin lighting is not necessary, e.g. in case of a head turning action of a passenger at a rear seat, not at a front seat. If such an event is repeated, the passenger may feel troublesomeness with the vehicle cabin lighting itself as a result.

Therefore, the present invention is focused on the above described problem, and an objective of the present invention is to provide a lighting control system and a lighting control method which enable a vehicle cabin lighting to be controlled with suppressed turning on which is unnecessary.

In order to achieve the above objective, a lighting control system according to the present invention includes: a vehicle cabin lighting for illuminating from above an interior of a vehicle cabin in a vehicle with a front seat and a rear seat; an information acquisition unit for acquiring distance measurement information about the interior of the vehicle cabin from a front side reference position in the vehicle cabin; a determination unit for determining based on the distance measurement information at least whether a front seat passenger sitting on the front seat performed a head turning action in which he turned his head toward a side of the rear seat; and a control unit for performing on/off-control of the vehicle cabin lighting at least based on a determination result from the determination unit.

Furthermore, in order to achieve the above objective, a lighting control method according to the present invention includes: an information acquisition step of acquiring distance measurement information about the interior of a vehicle cabin of a vehicle from a front side reference position in the vehicle cabin, the vehicle having a front seat and a rear seat; a determination step of determining based on the distance measurement information at least whether a front seat passenger sitting on the front seat performed a head turning action in which he turned his head toward a side of the rear seat; and a control step of performing on/off-control of a vehicle cabin lighting at least based on a determination result from the determination step, the vehicle cabin lighting being provided for illuminating the interior of the vehicle cabin from above.

With a lighting control system and a lighting control method of the present invention, it is determined based on the distance measurement information about the interior of the vehicle cabin whether a head turning action of a front seat passenger is present or not in order to perform on/off-control of vehicle cabin lighting based on the determination result. Since the presence of the head turning action is determined based on the distance measurement information, it is possible to determine the presence of the head turning action of a front seat passenger accurately for which turning on the vehicle cabin lighting is needed. With a lighting control system and a lighting control method of the present invention, such accurate determination enables vehicle cabin lighting to be controlled with suppressed turning on which is unnecessary.

DETAILED DESCRIPTION OF THE PREFERRED EMBODIMENTS

Hereinafter, an embodiment of a lighting control system will be described.

Figure 1:
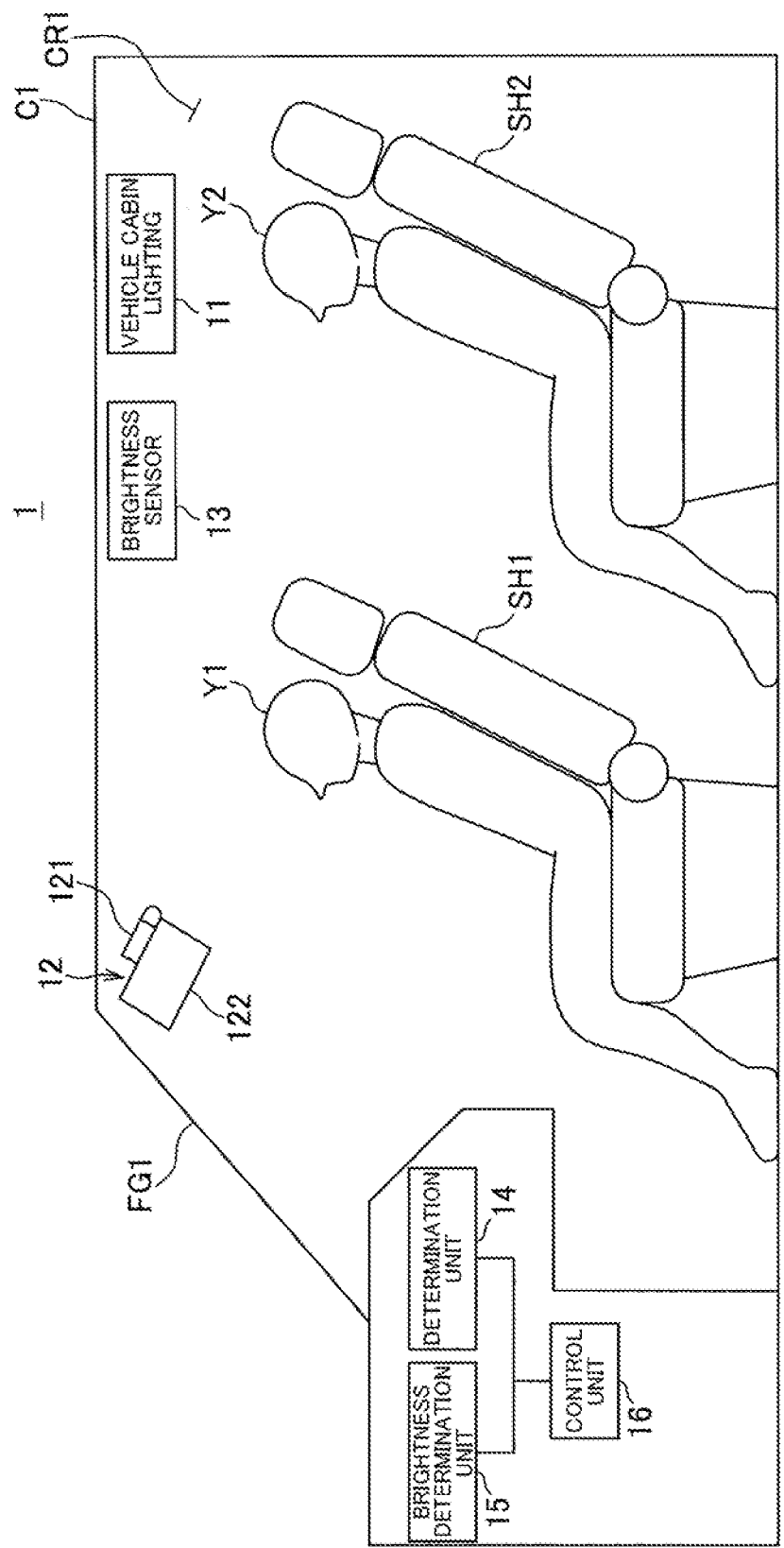
FIG. 1. is a schematic diagram illustrating an embodiment of a lighting control system.
Figure 2:
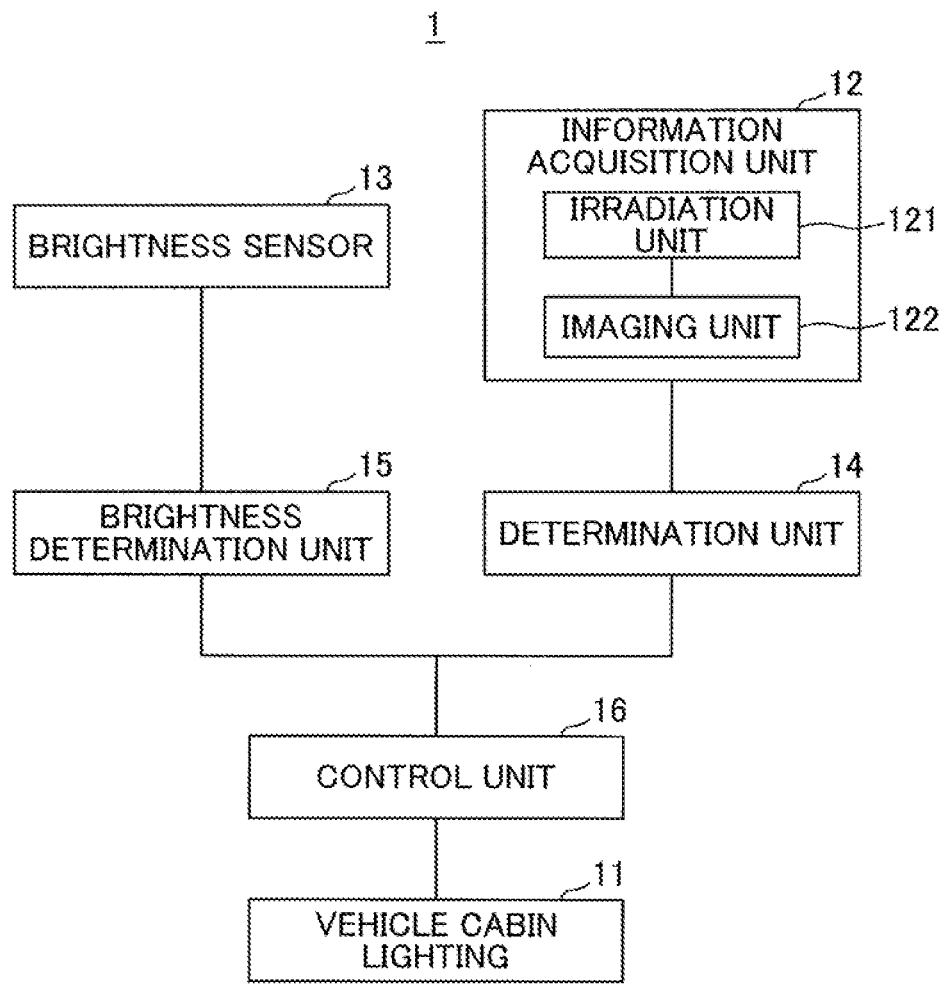
FIG. 2 is a schematic block diagram of the lighting control system shown in FIG. 1.

FIG. 1 is a schematic diagram illustrating an embodiment of a lighting control system. FIG. 2 is a schematic block diagram of the lighting control system shown in FIG. 1.

A lighting control system 1 according to the present embodiment controls a lighting inside a vehicle cabin CR1 in a vehicle C1 and includes a vehicle cabin lighting 11, an information acquisition unit 12, a brightness sensor 13, a determination unit 14, a brightness determination unit 15, and a control unit 16.

The vehicle cabin lighting 11 is provided for illuminating the interior of the vehicle cabin CR1 in the vehicle C1 from above, and is installed on a ceiling of the vehicle cabin CR1 closer to a rear seat SH2.

The information acquisition unit 12 acquires distance measurement information about the interior of the vehicle cabin CR1 from a front side reference position in the vehicle cabin CR1. More specifically, the information acquisition unit 12 is an imaging device which images the vehicle cabin CR1 from the front side reference position and obtains, as the distance measurement information, a three-dimensional image which additionally represents a distance to an object within an imaging range of the vehicle cabin CR1. As such an imaging device, although not specified herein, a conventional known camera or the like having a distance measurement function such as a stereo camera or a TOF (Time-of-Flight) camera may be employed as examples.

Further, the imaging device as the information acquisition unit 12 includes an irradiation unit 121 for irradiation with infrared radiation, and an imaging unit 122 capable of acquiring an image in an infrared range in order to enable imaging even when it is dark in the vehicle cabin CR1. The imaging unit 122 is arranged near an upper edge of a windshield FG1 so that both the front seat passenger Y1 sitting on the front seat SH1 and the rear seat passenger Y2 sitting on the rear seat SH2 are included within the imaging range. The position at which the imaging unit 122 is arranged corresponds to the front side reference position according to the present embodiment. Moreover, the irradiation unit 121 is attached to the imaging unit 122 so as to be able to sufficiently cover the imaging range of the imaging unit 122.

The brightness sensor 13 is provided for measuring the brightness inside the vehicle cabin CR1, and installed on the ceiling of the vehicle cabin CR1 closer to the rear seat SH2.

Based on the distance measurement information from the information acquisition unit 12, the determination unit 14 determines whether the front seat passenger Y1 in the front seat SH1 performed a head turning action in which he turned his head toward to a side of the rear seat SH2. Based on the distance measurement information from the information acquisition unit 12, the determination unit 14 further determines the presence of the rear seat passenger Y2 sitting on the rear seat SH2 and whether the front seat passenger Y1 performed a head turning back action in which he turned his head back toward a front side from a state in which his head had been facing toward the side of the rear seat SH2.

The brightness determination unit 15 determines whether the measurement result by the brightness sensor 13 is less than a predetermined threshold value.

The control unit 16, based on the determination result from the determination unit 14 and the determination result from the brightness determination unit 15, performs on/off-control of the vehicle cabin lighting 11. In other words, the control unit 16 performs the on/off-control based on whether the measurement result by the brightness sensor 13 is less than a predetermined threshold value or not, whether the head turning action of the front seat passenger Y1 was performed, and whether a rear seat passenger Y2 is present or not. More specifically, the control unit 16 turns on the vehicle cabin lighting 11 if it is determined in the determination unit 14 that no rear seat passenger Y2 is present and the above described head turning action was performed when the measurement result from the brightness sensor 13 is below the threshold value. Furthermore, if it is determined in the determination unit 14 that the head turning back action was performed by the front seat passenger Y1, the control unit 16 turns off the vehicle cabin lighting 11 which was turned on once.

Of the components of the lighting control system 1 described above, the determination unit 14, the brightness determination unit 15, and the control unit 16 are functional blocks configured in an ECU (Electronic Control Unit) mounted on the vehicle C1.

Next, a lighting control method executed in the lighting control system 1 will be described.

Figure 3:
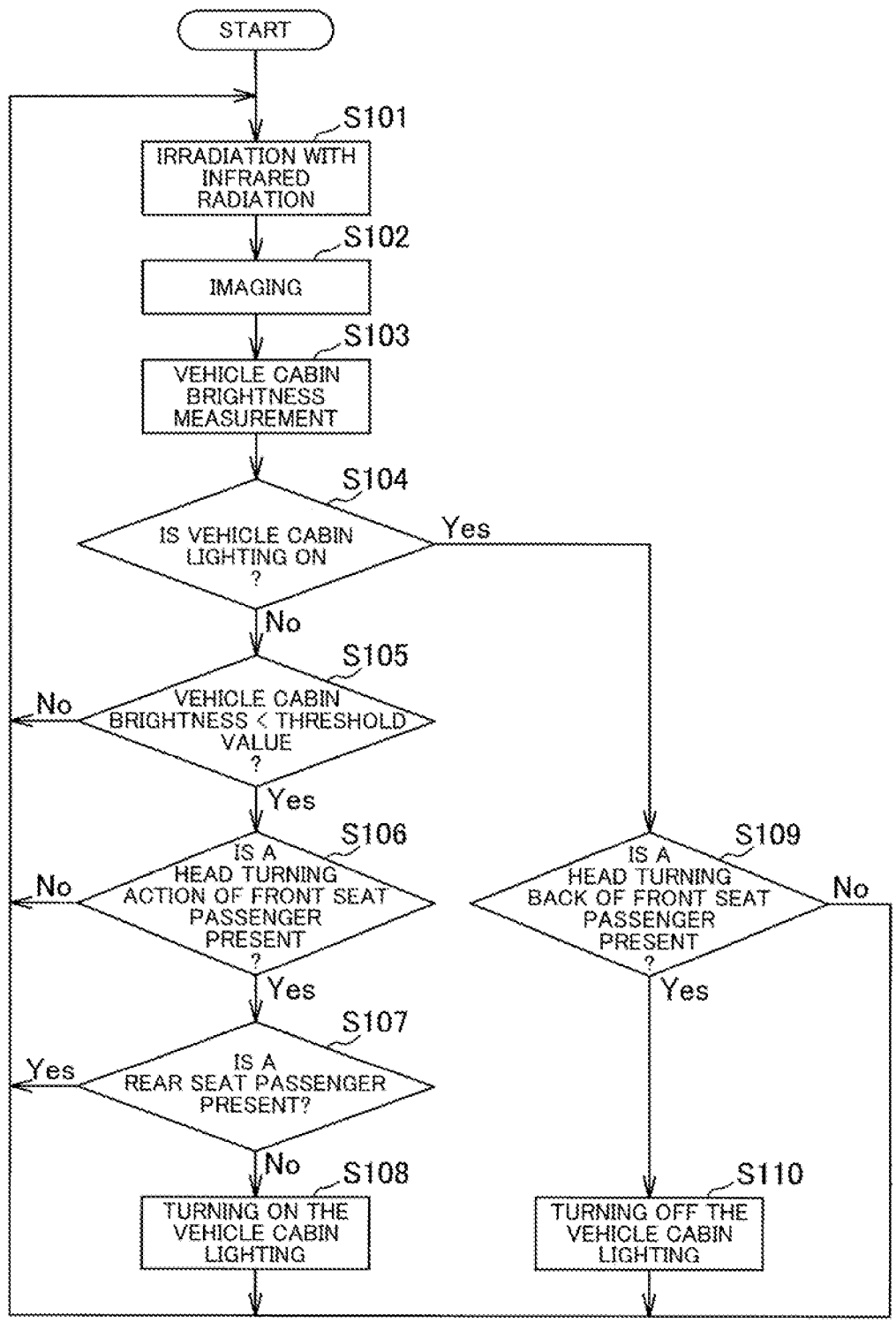
FIG. 3 is a flowchart illustrating a flow of processing in a lighting control method executed in the lighting control system illustrated in FIGS. 1 and 2.

FIG. 3 is a flowchart illustrating a flow of processing in a lighting control method executed in the lighting control system illustrated in FIGS. 1 and 2.

The lighting control method shown in FIG. 3 starts when power is supplied to the ECU of the vehicle C1. When the process starts, irradiation with infrared radiation by the irradiation unit 121 of the information acquisition unit 12 (step S101), the imaging by the imaging unit 122 under the irradiation (step S102), the brightness measurement by the brightness sensors 13 (step S103), are executed. The processing of the step S101, S102 corresponds to an example of the information acquisition step of acquiring the distance measurement information about the interior of the vehicle cabin CR1 from the front side reference position in the cabin CR1. Further, the processing of the step S103 corresponds to an example of a brightness measurement step of measuring the brightness inside the vehicle cabin CR1.

Next, it is determined by the determination unit 14 whether the vehicle cabin lighting 11 has been turned on or not (step S104). If it is determined that the vehicle cabin lighting 11 is not turned on (No-determination in the step S104), it is determined by the brightness determination unit 15 whether the brightness inside the vehicle cabin CR1 is below the threshold value or not (step S105). The processing of the step S105 corresponds to an example of a brightness determination step of determining whether the measurement result of the brightness is less than a predetermined threshold value.

When it is determined that the brightness is less than the threshold value (Yes-determination in the step S105), it is determined by the determination unit 14 based on the three-dimensional image as the distance measurement information obtained by the imaging unit 122 whether the front seat passenger Y1 performed the head turning action or not (step S106). If it is determined that the head turning action was performed (Yes-determination in the step S106), it is determined by the determination unit 14 based on the above-mentioned image whether a rear seat passenger Y2 is present or not (step S107). If it is then determined that no rear seat passenger Y2 is present (No-determination in the step S107), the vehicle cabin lighting 11 is turned on by the control unit 16 (step S108). Thereafter, the process returns to the step S101 and the subsequent process is repeated. The processing of the step S106 corresponds to an example for a determination step of determining based on the distance measurement information from the above-mentioned information acquisition step (step S101, S102) whether the front seat passenger Y11 performed the head turning action. Further, the processing of the step S107 corresponds to an example for the determination step of determining whether a rear seat passenger Y2 is present.

If it is determined that the brightness is not below the threshold value (No-determination in the step S105), if it is determined that no head turning action was performed (No-determination in the step S106), the vehicle cabin lighting 11 is not turned on, wherein the process returns to the step S101 and the subsequent process is repeated.

Furthermore, if it is determined that a rear seat passenger Y2 is present (Yes-determination in the step S107), turning on the vehicle cabin lighting 11 is similarly omitted, wherein the process returns to the step S101 and the subsequent process is repeated.

On the other hand, if it is determined in the step S104 that the vehicle cabin lighting 11 is on (Yes-determination in the step S104), it is determined by the determination unit 14 that the front seat passenger Y1 performed a head turning back action or not (step S109). If it is determined that the head turning back action was performed (Yes-determination in the step S109), the vehicle cabin lighting 11 is turned off by the control unit 16 (step S110). Thereafter, the process returns to the step S101 and the subsequent process is repeated. On the other hand, if it is determined that the head turning back action has not been performed (No-determination in the step S109), the vehicle cabin lighting 11 is not turned off, wherein the process returns to the step S101 and the subsequent process is repeated. The processing in the step S109 corresponds to an example for the determination step of further determining whether the front seat passenger Y11 performed the head turning back action of turning back his head. And the processing in the steps S108, S110 correspond to examples for the control step of performing on/off-control of the vehicle cabin lighting 11 based on the determination result from the determination step (steps S106, S107, S109).

The processing of the flowchart shown in FIG. 3 is repeated until the power supply to the ECU of the vehicle C1 is cut off.

Figure 4:
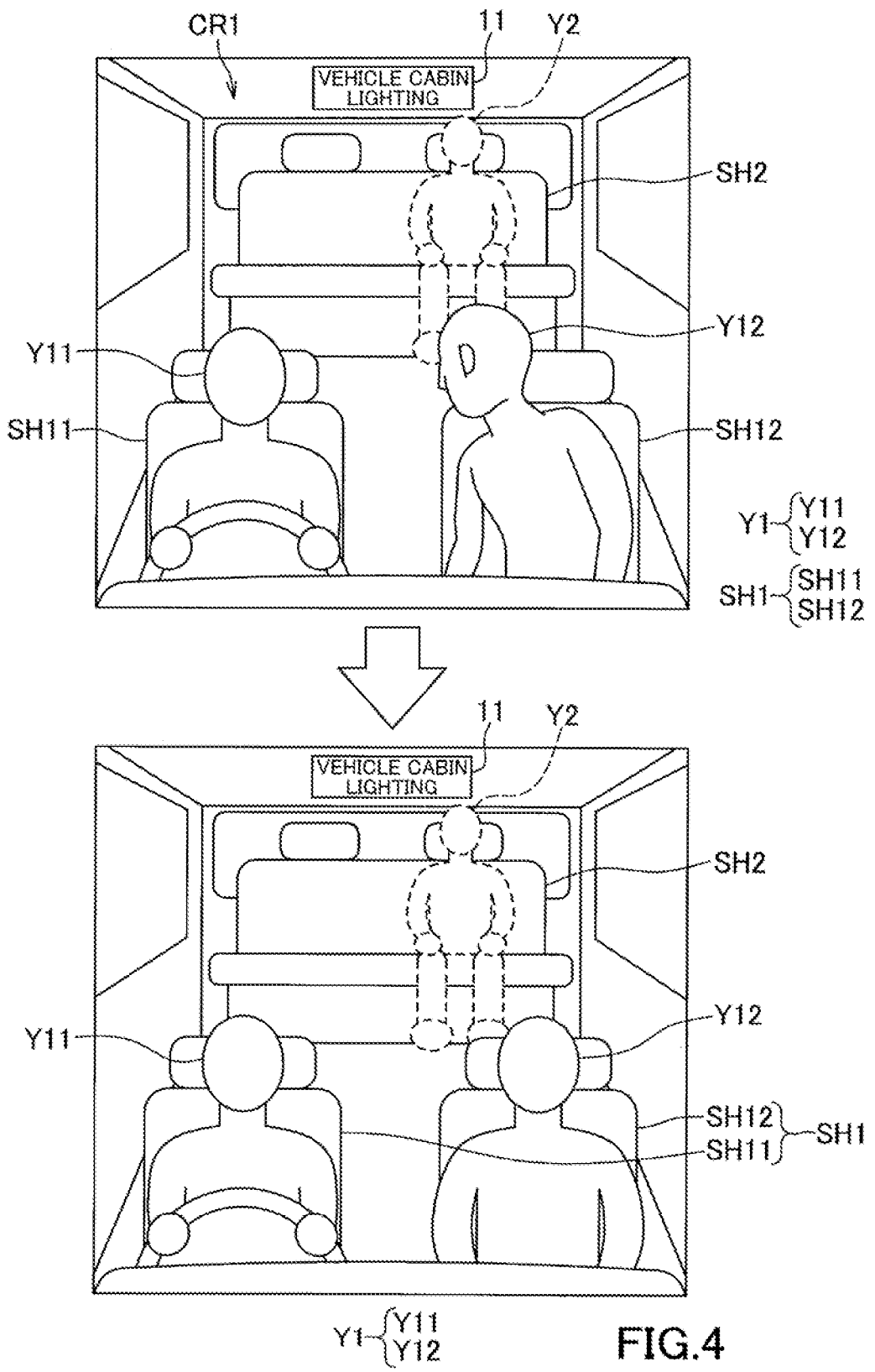
FIG. 4 is a schematic view illustrating an example of how the interior of the cabin is when the lighting control method is executed in accordance with the flowchart shown in FIG. 3.

FIG. 4 is a schematic view illustrating an example of how the interior of the cabin is when the lighting control method is executed in accordance with the flowchart shown in FIG. 3.

In the example of FIG. 4, a driver Y111 of the passengers Y1 is sitting on a driver's seat SH11, and a front passenger Y112 is sitting on a front passenger seat SH12 of the front seats SH1. Further, no rear seat passenger Y2 is present in the rear seat SH2. In this instance, if the front passenger Y12 of the front passenger seat SH12 performs a head turning action, the vehicle cabin lighting 11 is turned on when the brightness inside the vehicle cabin CR1 is less than a threshold. On the other hand, in case that a rear seat passenger Y2 is present, the vehicle cabin lighting 11 is not turned on even if the front passenger Y12 performs a head turning action.

Further, if the front passenger Y12 performs a head turning back action after turning on the vehicle cabin lighting 11, the vehicle cabin lighting 11 is turned off.

According to the embodiment of the lighting control system 1 and the lighting control method as described above, the presence of the head turning action by the front seat passenger Y11 is determined based on the distance measurement information about the interior of the vehicle cabin CR1, wherein the on/off-control of the vehicle cabin lighting 11 is performed based on the determination result. Since the presence of the head turning action is determined based on the distance measurement information, it is possible to determine the presence of the head turning action by the front seat passenger Y11 accurately for which turning on the vehicle cabin lighting 11 is needed. With the present embodiment, such accurate determination enables the vehicle cabin lighting 11 to be controlled with suppressed turning on which is unnecessary.

Here, when a rear seat passenger Y2 is present, the front seat passengers Y1 can ask this rear seat passenger Y2 to check luggage in the rear seat etc., wherein it is often unnecessary to turn on the vehicle cabin lighting 11. With the present embodiment, the vehicle cabin lighting 11 can be controlled with further suppressed turning on which is unnecessary, since the on/off-control is performed based on whether the head turning action of the front seat passenger Y1 was performed or not, and whether a rear seat passenger Y2 is present or not.

Furthermore, with the present embodiment, it can be guaranteed that unnecessary turning on the vehicle cabin lighting 11 is suppressed when a rear seat passenger Y2 is present, since the vehicle cabin lighting 11 is turned on only when no rear seat passenger Y2 is present and the head turning action of the front seat passenger Y1 was performed.

Furthermore, the present embodiment is preferable since the vehicle cabin lighting 11 which was once turned on is automatically turned off upon a head turning back action of the front seat passenger Y1.

Moreover, the present embodiment enables unnecessary turning on the vehicle cabin lighting 11 to be suppressed when it is bright, since the on/off-control of the vehicle cabin lighting 11 is performed additionally based on the brightness inside the vehicle cabin CR1.

Furthermore, the present embodiment enables more accurate determination of the presence of the head turning action, since the distance measurement information is taken as an image together with movement of passengers etc.

Further, according to the present embodiment, the imaging device as the information acquisition unit 12 includes an irradiation unit 121 for irradiation with infrared radiation and an imaging unit 122 capable of acquiring an image in the infrared range. According to such an imaging device, even when it is dark in the vehicle cabin CR1, it is possible to more accurately determine the presence or absence of the head turning action since the image in the infrared range is acquired.

It is to be noted that the embodiments described above merely show exemplary embodiments representative for the lighting control system and the lighting control method, the lighting control system and the lighting control method can be implemented in various variations rather than limited thereto.

For example, the above-described embodiment illustrates the lighting control system 1 in which the vehicle cabin lighting 11 and the brightness sensor 13 are installed on the ceiling of the vehicle cabin CR1. Also, for the information acquisition unit, the information acquisition unit 12 is illustrated as an example which has the imaging unit 122 installed with a vicinity area of the upper edge of the windshield FG1 as the front side reference position as well as the irradiation unit 121 attached to this imaging unit 122. However, the installation position of each of these components is not limited to those according to the above embodiment, but may be located at any position which fulfills a performance required by each of the components.

Further, according to the above-described embodiment, the determination unit 14, the brightness determination unit 15, and the control unit 16 configured in the ECU mounted on the vehicle C1 are exemplified. However, the configuration site of these components is not limited to the ECU, but may be a computer device or the like mounted on the vehicle C1 separately from the ECU.

Further, according to the above-described embodiment, the brightness sensor 13 for measuring the brightness inside the vehicle cabin CR1 are illustrated as an example for the brightness sensor. However, the brightness sensor is not limited thereto and may measure e.g. the brightness outside the vehicle cabin CR1. Furthermore, the brightness determination may utilize a method for determining the brightness indirectly without such a brightness sensor. As an example for the indirect brightness determination, a method based on information indicating a situation of the vehicle C1 is possible, such as e.g. information indicating whether a small lamp as an auxiliary light source has been turned on which is configured to be turned on/off by an manual operation of a passenger. According to this method, the brightness determination is performed e.g. with regard to the brightness inside the vehicle cabin CR1, for example it is determined that it is dark if the small lamp is on, wherein it is determined that it is bright if the small lamp is off.

Furthermore, as an example, the above described embodiment illustrates the lighting control system 1 and the lighting control method for performing on/off-control of the vehicle cabin lighting 11 based on whether the head turning action of the front seat passenger Y1 was performed, and the presence of a rear seat passenger Y2. In this embodiment, the on/off-control is further configured so that the vehicle cabin lighting 11 is turned on when no rear seat passenger Y2 is present and the head turning action of the front seat passenger Y1 was performed. However, the lighting control system and the lighting control method are not limited thereto and may perform on/off-control of the vehicle cabin lighting 11 only based on the presence of the head turning action regardless of a rear seat passenger Y2. However, as described above, the vehicle cabin lighting can be controlled with further suppressed unnecessary turning on by performing the on/off-control additionally based on the presence of a rear seat passenger Y2.

As an example, the above described embodiment further illustrates the lighting control system 1 and the lighting control method in which the determination is also performed whether a head turning back action of the front seat passenger Y1 is present, wherein the vehicle cabin lighting 11 which was once turned on is turned off when the head turning back action was performed. However, the lighting control system and the lighting control method are not limited thereto, and the vehicle cabin lighting 11 which was once turned on may be turned off by manual operation by a passenger. However, as described above as well, the vehicle cabin lighting 11 is turned off automatically performed upon the head turning back action as described above, thereby eliminating efforts of the passenger which is preferable.

Further, according to the above-described embodiment, a lighting control system 1 and a lighting control method are exemplified in which on/off-control of the vehicle cabin lighting 11 is performed additionally on the basis of a determination result of whether the measurement result of the brightness inside the vehicle cabin CR1 is less than a threshold value. However, the lighting control systems and the lighting control methods are not limited thereto, and the on/off-control of the vehicle cabin lighting 11 may be performed based on the presence of the head turning action of the front seat passenger Y1 regardless of the brightness inside the cabin CR1. However, by performing the on/off-control of the vehicle cabin lighting 11 additionally on the basis of the brightness inside the vehicle cabin CR1, it is also possible to suppress unnecessary turning on the vehicle cabin lighting in case it is bright in the vehicle cabin CR1 as described above.

Further, in the above-described embodiment, a lighting control system 1 and a lighting control method are exemplified in which, as the distance measurement information, a three-dimensional image is obtained that also represents the distance to an object within the imaging range. However, the lighting control system and the lighting control method are not limited thereto, but may acquire the distance measurement information from the front side reference position as a simple distance data. However, as described above as well, the presence of the head turning action can be more accurately determined by obtaining the image as the distance measurement information.

Further, according to the above-described embodiment, a lighting control system 1 and a lighting control method are exemplified in which irradiation with infrared radiation is performed to capture an image in the infrared range in order to obtain the above-described image. However, the lighting control system and the lighting control method are not limited thereto, but may capture only an image in the visible light range. However, by acquiring the image in the infrared range, it is also possible to more accurately determine the presence of the head turning action even when it is dark in the cabin, as described above as well.

REFERENCE SIGNS LIST

1 Lighting control system
11 Vehicle cabin lighting
12 Information acquisition unit
13 Brightness sensor
14 Determination unit
15 Brightness determination unit
16 Control unit
121 Irradiation unit
122 Imaging unit
C1 Vehicle
CR1 Vehicle cabin
SH1 Front seats
SH2 Rear seat
Y1 Front seat passenger
Y2 Rear seat passenger

What is claimed is:

1. A lighting control system comprising:
a vehicle cabin lighting for illuminating from above an interior of a vehicle cabin in a vehicle with a front seat and a rear seat;
an imaging device for acquiring distance measurement information about the interior of the vehicle cabin from a front side reference position in the vehicle cabin; and
an electronic control unit (ECU) configured to:
determine based on the distance measurement information at least whether a front seat passenger sitting on the front seat performed a head turning action in which he turned his head toward a side of the rear seat; and
perform on/off-control of the vehicle cabin lighting at least based on determining whether the front seat passenger performed the head turning action.

2. The lighting control system according to claim 1, wherein the ECU is further configured to:
determine whether a rear seat passenger sitting on the rear seat is present or not; and
perform the on/off-control based on whether the head turning action was performed or not, and based on whether the rear seat passenger is present or not.

3. The lighting control system according to claim 2, wherein the ECU is further configured to:
turn on the vehicle cabin lighting based on determining that the rear seat passenger is not present and the head turning action was performed.

4. The lighting control system according to claim 3, wherein the ECU is further configured to:

determine whether the front seat passenger performed a head turning back action in which he turned his head back toward a front side from a state in which his head had been facing toward the side of the rear seat; and turn off the vehicle cabin lighting which was turned on based on determining that the head turning back action was performed.

5. The lighting control system according to claim 4, further comprising:

a brightness sensor for measuring brightness in at least one of an interior and an exterior of the vehicle cabin; and wherein the ECU is further configured to:

determine whether a measurement result from the brightness sensor is less than a predetermined threshold value or not; and perform the on/off-control based on determining whether the measurement result is less than the predetermined threshold value or not.

6. The lighting control system according to claim 4, wherein the imaging device is further configured to image the vehicle cabin and obtain an image which additionally represents a distance to an object within an imaging range of the vehicle cabin.

7. The lighting control system according to claim 3, further comprising:

a brightness sensor for measuring brightness in at least one of an interior and an exterior of the vehicle cabin; and wherein the ECU is further configured to:

determine whether a measurement result from the brightness sensor is less than a predetermined threshold value or not; and perform the on/off-control based on determining whether the measurement result is less than the predetermined threshold value or not.

8. The lighting control system according to claim 3, wherein the imaging device is further configured to image the vehicle cabin and obtain an image which additionally represents a distance to an object within an imaging range of the vehicle cabin.

9. The lighting control system according to claim 2, wherein the ECU is further configured to:

determine whether the front seat passenger performed a head turning back action in which he turned his head back toward a front side from a state in which his head had been facing toward the side of the rear seat; and turn off the vehicle cabin lighting which was turned on based on determining that the head turning back action was performed.

10. The lighting control system according to claim 9, further comprising:

a brightness sensor for measuring brightness in at least one of an interior and an exterior of the vehicle cabin; and wherein the ECU is further configured to:

determine whether a measurement result from the brightness sensor is less than a predetermined threshold value or not; and perform the on/off-control based on determining whether the measurement result is less than the predetermined threshold value or not.

11. The lighting control system according to claim 9, wherein the imaging device is further configured to image the vehicle cabin and obtain an image which additionally represents a distance to an object within an imaging range of the vehicle cabin.

12. The lighting control system according to claim 2, further comprising:

a brightness sensor for measuring brightness in at least one of an interior and an exterior of the vehicle cabin; and wherein the ECU is further configured to:

determine whether a measurement result from the brightness sensor is less than a predetermined threshold value or not; and perform the on/off-control based on determining whether the measurement result is less than the predetermined threshold value or not.

13. The lighting control system according to claim 2, wherein the imaging device is further configured to image the vehicle cabin and obtain an image which additionally represents a distance to an object within an imaging range of the vehicle cabin.

14. The lighting control system according to claim 1, wherein the ECU is further configured to:

determine whether the front seat passenger performed a head turning back action in which he turned his head back toward a front side from a state in which his head had been facing toward the side of the rear seat; and turn off the vehicle cabin lighting which was turned on based on determining that the head turning back action was performed.

15. The lighting control system according to claim 14, further comprising:

a brightness sensor for measuring brightness in at least one of an interior and an exterior of the vehicle cabin; and wherein the ECU is further configured to:

determine whether a measurement result from the brightness sensor is less than a predetermined threshold value or not; and perform the on/off-control based on determining whether the measurement result is less than the predetermined threshold value or not.

16. The lighting control system according to claim 14, wherein the imaging device is further configured to image the vehicle cabin and obtain an image which additionally represents a distance to an object within an imaging range of the vehicle cabin.

17. The lighting control system according to claim 1, further comprising:

a brightness sensor for measuring brightness in at least one of an interior and an exterior of the vehicle cabin; and wherein the ECU is further configured to:

determine whether a measurement result from the brightness sensor is less than a predetermined threshold value or not; and perform the on/off-control based on determining whether the measurement result is less than the predetermined threshold value or not.

18. The lighting control system according to claim 1, wherein the imaging device is further configured to image the vehicle cabin and obtain an image which additionally represents a distance to an object within an imaging range of the vehicle cabin.

19. The lighting control system according to claim 18, wherein the imaging device comprises:

an irradiation unit configured to irradiate infrared radiation; and an imaging unit configured to acquire an image in an infrared range.

20. A lighting control method comprising:
acquiring distance measurement information about an interior of a vehicle cabin of a vehicle from a front side reference position in the vehicle cabin, the vehicle having a front seat and a rear seat;
determining based on the distance measurement information at least whether a front seat passenger sitting on the front seat performed a head turning action in which he turned his head toward a side of the rear seat; and
performing on/off-control of a vehicle cabin lighting at least based on determining whether the front seat passenger performed the head turning action, the vehicle cabin lighting being provided for illuminating the interior of the vehicle cabin from above.

\* \* \* \* \*